(12) United States Patent
Masuda (10) Patent No.: US 11,749,044 B2
(45) Date of Patent: Sep. 5, 2023

(54) GATE CONTROL DEVICE, GATE CONTROL METHOD, AND GATE CONTROL PROGRAM

(71) Applicant: TOSHIBA TEC KABUSHIKI KAISHA, Tokyo (JP)

(72) Inventor: Takuro Masuda, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 110 days.

(21) Appl. No.: 17/366,615

(22) Filed: Jul. 2, 2021

(65) Prior Publication Data

US 2022/0084342 A1 Mar. 17, 2022

(30) Foreign Application Priority Data

Sep. 16, 2020 (JP) .................................. 2020-155168

(51) Int. Cl.
*G07C 9/25* (2020.01)
*G05B 19/042* (2006.01)

(52) U.S. Cl.
CPC ............ *G07C 9/257* (2020.01); *G05B 19/042* (2013.01); *G05B 2219/24162* (2013.01)

(58) Field of Classification Search
CPC .............................. G07C 9/257; G05B 19/042
USPC ........................................................ 700/275
See application file for complete search history.

(56) References Cited

U.S. PATENT DOCUMENTS

| | | | | |
|---|---|---|---|---|
| 2002/0132663 A1* | 9/2002 | Cumbers | ............. | G07F 17/3239 463/25 |
| 2004/0078260 A1* | 4/2004 | Milgramm | ......... | G06Q 30/0613 705/7.29 |
| 2015/0120547 A1* | 4/2015 | Ghosh | ................ | G06Q 20/4012 705/44 |
| 2018/0047007 A1* | 2/2018 | High | .................. | G06K 7/10297 |
| 2019/0019191 A1* | 1/2019 | Jung | ...................... | G06Q 20/18 |

FOREIGN PATENT DOCUMENTS

| | | | | |
|---|---|---|---|---|
| JP | 2019079264 A | | 5/2019 | |
| JP | 2020060889 A | * | 4/2020 | .............. E05F 3/222 |

* cited by examiner

*Primary Examiner* — Mohammad Ali
*Assistant Examiner* — Joshua T Sanders
(74) *Attorney, Agent, or Firm* — Kim & Stewart LLP (57) ABSTRACT

In an embodiment, a gate control device includes a communication interface to receive first biometric information from a first gate device at an entrance and second biometric information from a second gate device at an exit. A storage unit stores the first biometric information. A processor is configured to cause the received first biometric information to be stored in the storage unit, transmit an opening instruction to the first gate device via the communication interface once the first biometric information has been stored in the storage unit, and, when the second biometric information is received via the communication interface, compare the second biometric information to the first biometric information stored in the storage unit to determine if the received second biometric information matches the stored first biometric information, then transmit an opening instruction to the second gate device if the received second biometric information matches the stored biometric information.

16 Claims, 5 Drawing Sheets

GATE CONTROL DEVICE, GATE CONTROL METHOD, AND GATE CONTROL PROGRAM

CROSS-REFERENCE TO RELATED APPLICATION

This application is based upon and claims the benefit of priority from Japanese Patent Application No. 2020-155168, filed Sep. 16, 2020, the entire contents of which are incorporated herein by reference.

FIELD

Embodiments described herein relate generally to a gate control device, a gate control method, and a gate control program.

BACKGROUND

At a store, such as a convenience store, that may be open twenty-four hours or until late at night, often only a small number of store clerks are stationed during the off-peak time periods such as around midnight, early in the morning, or the like when few customers normally visit the store. In recent years, some stores are operated as unmanned locations or with only a minimum number of people because of decreases in the available worker population or the like. However, more lightly staffed a store is, the more likely it is that crimes such as shoplifting and burglary may occur at the store.

There is a known apparatus for limiting the number of people who enter a building by user authentication that compares biological (biometric) information obtained at an entrance, a gate, or the like of the building with pre-stored biological (biometric) information of registered users with confirmed identifications or IDs and permits only the authenticated users to enter the building. Entering of customers to a convenient store or the like may be controlled by using this known apparatus in an attempt to prevent shoplifting, burglary, or the like.

However, since users must register their biological information in advance or they may need to obtain a membership or the like of a store or a provided service, the known apparatus may not be convenient for some users or store customers. Also, since a store need to manage a relatively large volume of biological information, personal information and the like of customers, there is a concern of security and cost.

Therefore, there is a need for a gate control device, a gate control method, and a gate control program with a simpler configuration or processing capable of controlling entry of customers at a store or the like in a more efficient manner so as to effectively reduce or prevent crimes.

DETAILED DESCRIPTION

According to one embodiment, a gate control device includes a communication interface to receive first biometric information from a first gate device for a person at an entrance and second biometric information from a second gate device for a person at an exit. A storage unit of the gate control device stores the first biometric information. A processor of the gate control device is configured to cause the received first biometric information to be stored in the storage unit, transmit an opening instruction to the first gate device via the communication interface once the first biometric information has been stored in the storage unit, and, when the second biometric information is received via the communication interface, compare the second biometric information to the first biometric information stored in the storage unit to determine if the received second biometric information matches the stored first biometric information, then transmit an opening instruction to the second gate device if the received second biometric information matches the stored biometric information.

Some example embodiments of a gate control device, a gate control method, and a gate control program are described below with reference to the accompanying drawings. These example embodiments are mainly directed to a case in which the gate control device, the gate control method, or the gate control program is installed or utilized at a retail store such as a convenience store operating with limited staffing. However, the business format, the business manner, and the like of a store or location using any of the present embodiments is not limited in any way to the particularly described examples. The store may be a fully manned store where store clerks are continuously present to serve customers or may be an entirely unmanned (automated) store. The gate control device, the gate control method, and the gate control program can be used at various buildings, locations, worksites, places, or the like for which access may need to be controlled and/or monitored.

Figure 1:
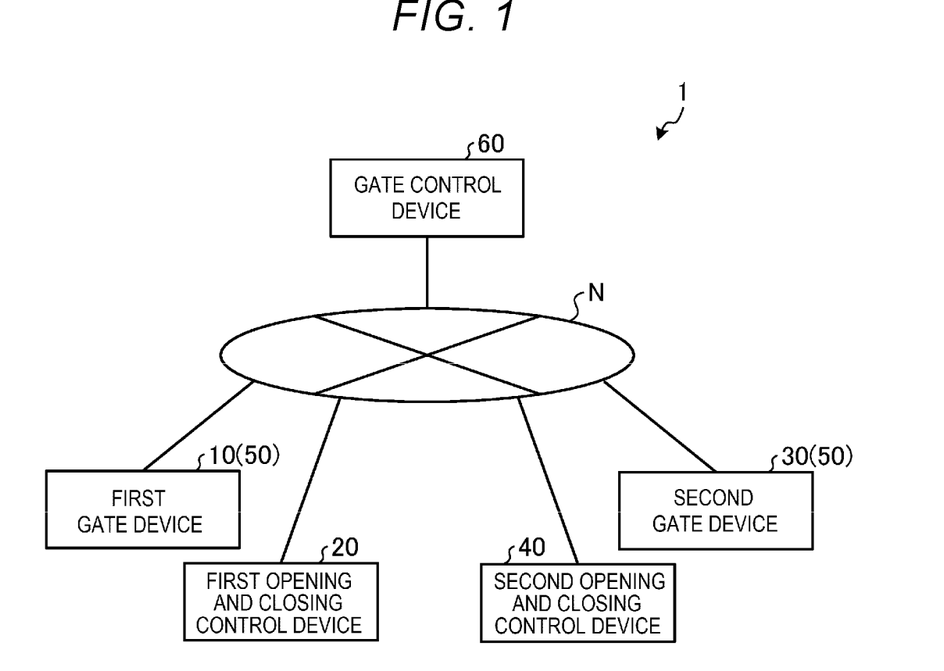
FIG. 1 depicts an example configuration of a gate control system according to an embodiment.

FIG. 1 depicts an example configuration of the gate control system 1 according to an embodiment. The gate control system 1 includes a first gate device 10, a first opening and closing control device 20, a second gate device 30, a second opening and closing control device 40, and a gate control device 60. The first gate device 10, the first opening and closing control device 20, the second gate device 30, and the second opening and closing control device 40 are communicably connected to the gate control device 60 via a wired or wireless network N.

The first gate device 10 is an example of a gate device. The first gate device 10 can be provided, for example, near an entrance to a store. For example, the first gate device 10 may be just outside the entrance of the store. The first gate device includes a first acquiring unit that acquires biometric information from a customer before the customer enters the store. The first gate device 10 transmits the acquired biometric information to the gate control device 60 as first biometric information.

The second gate device 30 is another example of a gate device and is provided, for example, near an exit inside of the store. The second gate device 30 includes a second acquiring unit that acquires biometric information from a customer before the customer leaves the store. The second gate device 30 transmits the acquired biometric information to the gate control device 60 as second biometric information.

The configuration of the first gate device 10 may be the same as or different from that of the second gate device 30. At least one type of first biometric information acquired by the first gate device 10 is the same as a corresponding type of the second biometric information acquired by the second gate device. In the present embodiment, the first gate device 10 has the same configuration as that of the second gate device 30, and both devices are collectively referred to as "a gate device 50" as well.

Figure 2:
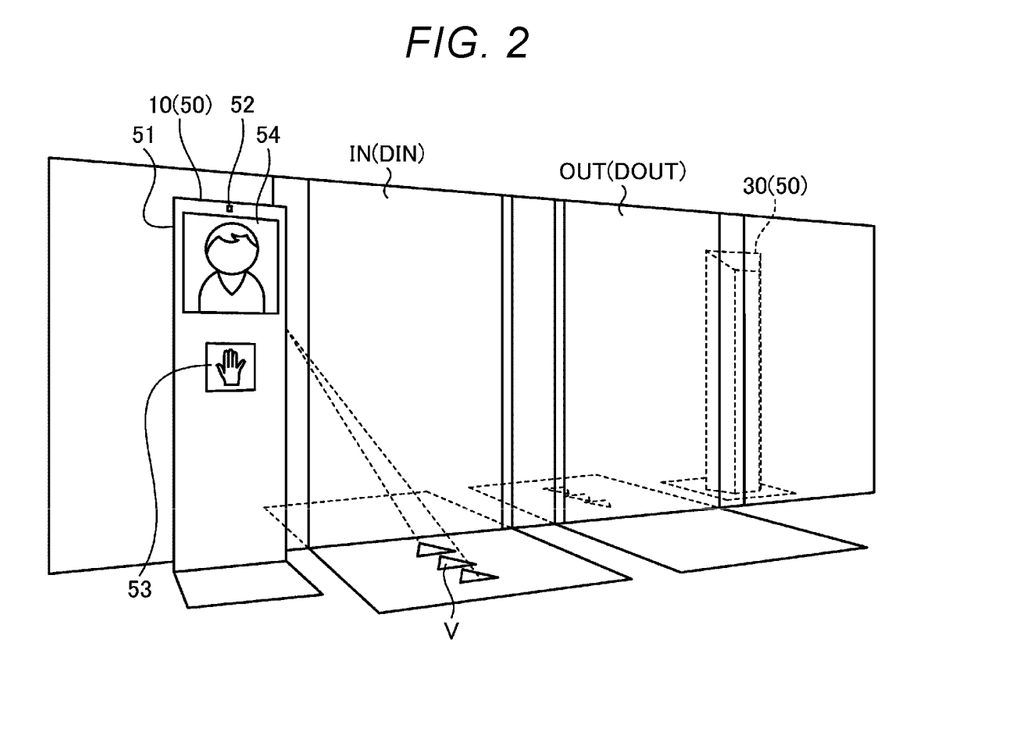
FIG. 2 depicts an example exterior configuration of a gate device according to an embodiment.

FIG. 2 an example exterior configuration of the first and second gate devices 10 and 30 (or the gate device 50) at store entrance and exit according to the present embodiment. The first gate device 10 is placed on one side of an entrance IN (for example, to the left of an entrance door DIN) outside the store such that the first gate device 10 can face or be operated by a customer before the customer enters the entrance door DIN. The second gate device 30 is placed on one side of an exit OUT (for example, to the left of an exit door DOUT) inside the store such that the second gate device 30 can face or be operated by a customer before the customer leaves the exit door DOUT. The entrance IN and the exit OUT are provided next to each other in the present example. Both a front side (the one near the entrance IN) and a rear side (the one near the exit OUT) of the gate device 50 are illustrated in FIG. 2. The entrance door DIN and the exit door DOUT may be an entrance gate and an exit gate, respectively.

The first gate device 10 includes a substantially rectangular parallelepiped housing 51 and is erected in a state in which a long side of the housing 51 is directed in the height direction. The housing 51 includes an imaging unit 52, a reading unit 53, and a display unit 54 on the front side that faces a customer.

The imaging unit 52 includes an imaging device or an image capturing device including an imaging element such as a CCD (Charge Coupled Device). The reading unit 53 includes a sensor device for reading a fingerprint, a palm print, or the like (collectively referred to as fingerprint information herein) from a hand of a customer who touches the reading unit 53. A sensing method of the reading unit 53 may be any method. A known technique can be used. The imaging unit 52 and the reading unit 53 are examples of an acquiring unit that acquires biometric information from a customer.

The display unit 54 is a display device, a touch panel, or the like configured by, for example, a Liquid Crystal Display (LCD). The display unit 54 displays a screen or the like for displaying a store entering method or a store leaving method under control of a guidance processing unit 511 (see FIG. 6). For example, the display unit 54 displays a screen or the like including a message for requesting a customer to place a hand on or touch the reading unit 53.

The first gate device 10 acquires a face image of a customer who wishes to enter the store by the imaging unit 52 and fingerprint information of the customer by the reading unit 53. The first gate device 10 transmits the face image and the fingerprint information acquired from the customer to the gate control device 60 as first biometric information. The face image and the fingerprint information acquired by the first gate device 10 are examples of element information of the first biometric information.

The second gate device 30 acquires a face image of a customer who wishes to leave the store by the imaging unit 52 and fingerprint information of the customer by the reading unit 53. The second gate device 30 transmits the face image and the fingerprint information acquired from the customer to the gate control device 60 as second biometric information. The face image and the fingerprint information acquired by the second gate device 30 are examples of element information of the second biometric information.

A form of the gate device 50 is not limited to the example illustrated in FIG. 2. For example, the gate device 50 may be provided in a form in which the imaging unit 52, the reading unit 53, the display unit 54, and the like are embedded in a wall surface of the store. The imaging unit 52 and the reading unit 53 may be separate. For example, the imaging unit 52 may be a monitoring camera or the like installed on the inside or the outside of the store.

Guidance to be given by the gate device 50 to a customer is not limited to the guidance via the screen of the display unit 54. For example, the gate device 50 may separately include a sound output device such as a speaker to give guidance by sound. The gate device 50 may start the guidance when a customer approaching the gate device 50 is detected by the imaging unit 52, a human sensor, or the like.

As illustrated in FIG. 2, the gate device 50 may project a video V for guiding a customer of store entry or store leaving onto a floor surface or the like. In this case, the gate device 50 may separately include a projector device for video projection and may start the projection of the video V, for example, upon acquisition of biometric information of a customer or according to an instruction from the gate control device 60.

Referring back to FIG. 1, the first opening and closing control device 20 controls opening and closing of the entrance door DIN at the entrance IN of the store. As one example, if the entrance door DIN is an automatic door, the first opening and closing control device 20 controls a driving unit which performs opening and closing of the automatic entrance door DIN. As another example, if the entrance door DIN is a manual door that is manually opened and closed, the first opening and closing control device 20 controls an automatic locking unit provided at the entrance door DIN to unlock and lock the entrance door DIN.

The first opening and closing control device 20 may be provided integrally with the entrance door DIN. The first opening and closing control device 20 may be provided integrally with the first gate device 10.

The second opening and closing control device 40 controls opening and closing of the exit door DOUT at the exit OUT of the store. As one example, if the exit door DOUT is an automatic door, the second opening and closing control device 40 controls a driving unit which performs opening and closing of the automatic exit door DOUT. As another example, if the exit door DOUT is a manual door that is manually opened and closed, the second opening and closing control device 40 controls an automatic locking unit provided at the exit door DOUT to unlock and lock the exit door DOUT.

The second opening and closing control device 40 may be provided integrally with the exit door DOUT. The second opening and closing control device 40 may be provided integrally with the second gate device 30.

The gate control device 60 controls store entry and store leaving of a customer based on biometric information acquired by the gate device 50. If the first biometric information of a customer who wishes to enter the store is acquired by the first gate device 10, the gate control device 60 permits store entry of the customer by transmitting an opening instruction for opening the entrance door DIN to the first opening and closing control device 20. If the second biometric information of a customer who wishes to leave the store is acquired by the second gate device 30, the gate control device 60 compares the second biometric information to the first biometric information acquired earlier by the first gate device 10. If the comparison is successful (that is the second biometric information matches the first biometric information), the gate control device 60 permits store leaving of the customer by transmitting an opening instruction for opening the exit door DOUT to the second opening and closing control device 40.

The gate control device 60 can be realized, for example, by an information processing device, such as a server device, provided in the store or outside the store.

Figure 3:
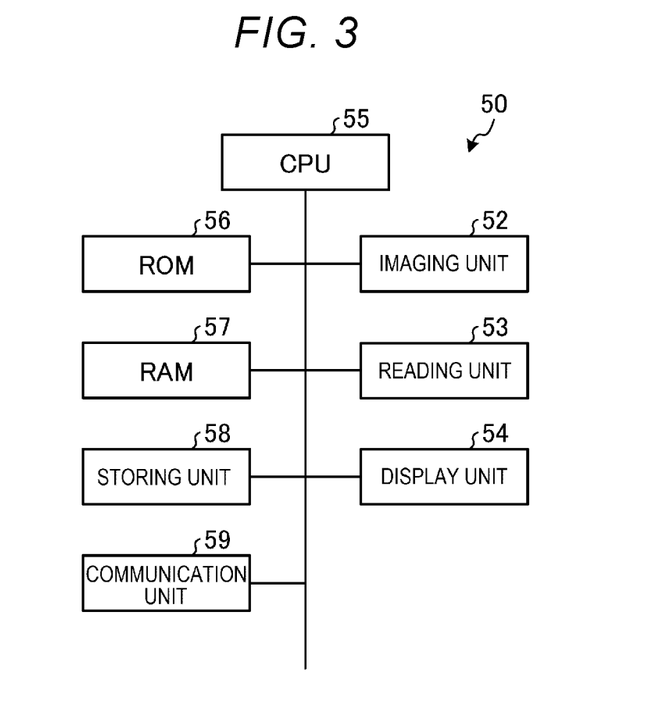
FIG. 3 depicts an example configuration of a gate device according to an embodiment.

FIG. 3 depicts an example configuration of the gate device 50 according to the present embodiment. The gate device 50 includes a Central Processing Unit (CPU) 55, a Read Only Memory (ROM) 56, a Random Access Memory (RAM) 57, a storing unit 58, and a communication unit 59 together with the imaging unit 52, the reading unit 53, the display unit 54, and the like. These units of the gate device 50 are connected to the CPU 55 via a bus or the like.

The CPU 55 is an example of a processor and collectively controls the units of the gate device 50. The ROM 56 stores various programs. The RAM 57 is a workspace in which programs and various data are loaded. The CPU 55, the ROM 56, and the RAM 57 realize a computer configuration of the gate device 50 and function as a control unit of the gate device 50.

The storing unit 58 is a storage device such as a Hard Disk Drive (HDD) or a flash memory. The storing unit 58 stores a program (or programs) to be executed by the CPU 55, setting information relating to the execution of the program, and the like.

The communication unit 59 is a communication interface that can be connected to the network N. The communication unit 59 is connected to the network N to transmit and receive various kinds of information to and from an external device such as the gate control device 60 connected to the network N.

Figure 4:
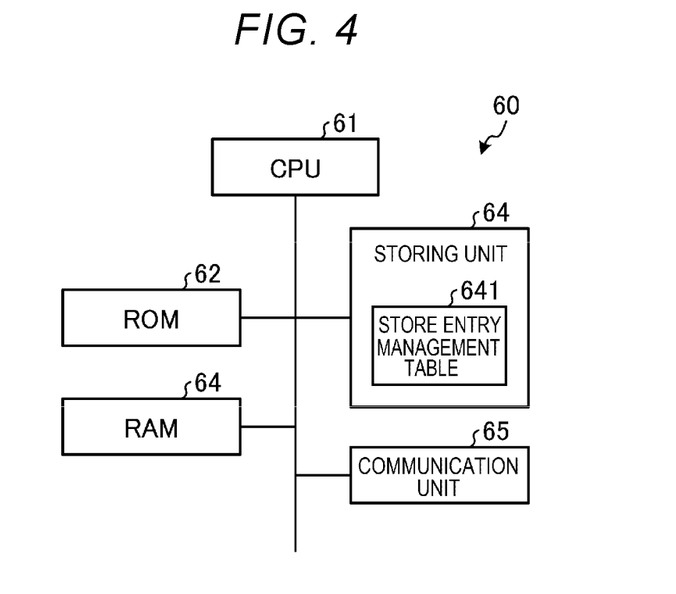
FIG. 4 depicts an example configuration of a gate control device according to an embodiment.

FIG. 4 depicts an example configuration of the gate control device 60 according to the present embodiment. The gate control device 60 includes a CPU 61, a ROM 62, a RAM 63, a storing unit 64, and a communication unit 65.

The CPU 61 is an example of a processor and collectively controls the units of the gate control device 60. The ROM 62 stores various programs. The RAM 63 is a workspace in which programs and various data are loaded. The CPU 61, the ROM 62, and the RAM 63 realize a computer configuration of the gate control device 60 and function as a control unit of the gate control device 60.

The storing unit 64 is a storage device such as an HDD or a flash memory. The storing unit 64 stores a program to be executed by the CPU 61, setting information relating to the execution of the program, and the like. The storing unit 64 stores a store entry management table 641 for retaining the first biometric information acquired by the first gate device 10.

Figure 5:
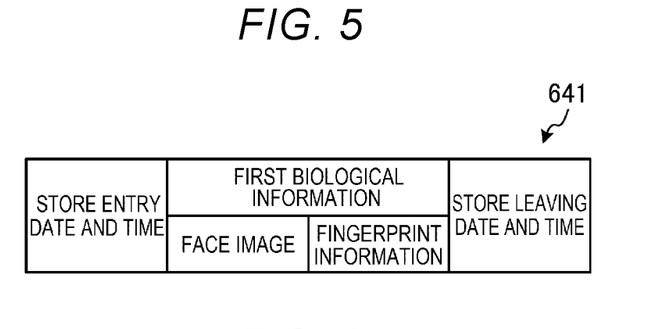
FIG. 5 depicts an example data configuration of a store entry management table according to an embodiment.

FIG. 5 depicts an example data configuration of the store entry management table 641 according to the present embodiment. The store entry management table 641 includes data items such as store entry date and time (or entrance entry date and time), first biometric information, and store leaving date and time (or exit leaving date and time). In the data item of the store or entrance entry date and time, date and time information indicating when a customer enters the entrance of the store is registered. In the data item of the first biometric information, the first biometric information (such as a face image or fingerprint information) of the customer acquired by the first gate device 10 is registered. In the data item of the store or exit leaving date and time, date and time information indicating when a customer leaves the exit of the store is registered. The data item of the store leaving date and time also functions as an identifier for identifying the first biometric information matching the second biometric information.

The data configuration of the store entry management table 641 is not limited to the example illustrated in FIG. 5. As another example, the store entry management table 641 may be configured to also retain the second biometric information of the customer corresponding to the first biometric information. The store entry management table 641 may be configured to retain, instead of the store leaving date and time, flag information indicating whether the customer has already left the store. In still another example, the store entry management table 641 may be configured to retain only the first biometric information.

Referring back to FIG. 4, the communication unit 65 is a communication interface that can be connected to the network N. The communication unit 65 is connected to the network N to transmit and receive various kinds of information to and from external devices, such as the first gate device 10, the first opening and closing control device 20, the second gate device 30, and the second opening and closing control device 40 connected to the network N.

Figure 6:
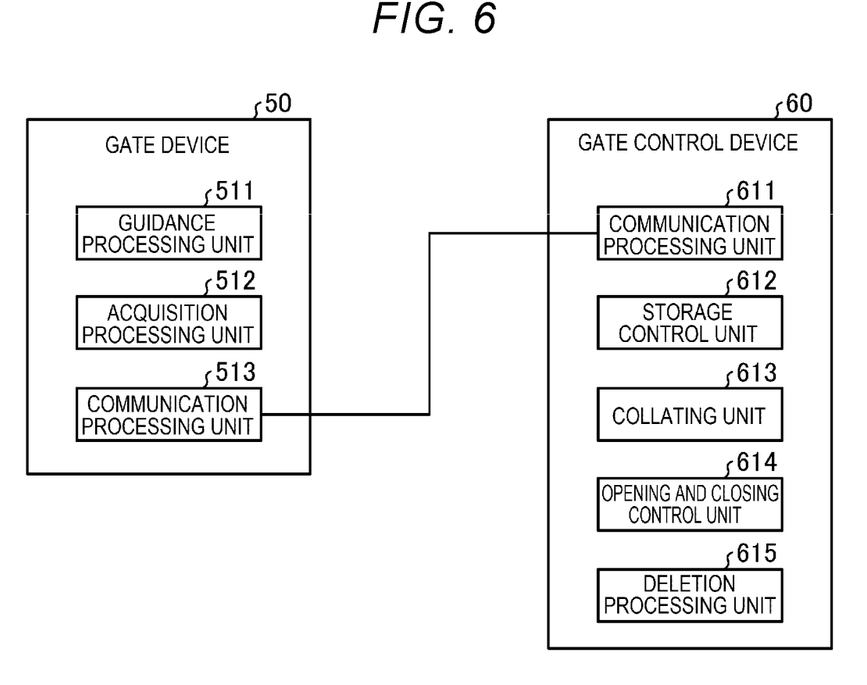
FIG. 6 depicts example configurations of a gate device and a gate control device according to an embodiment.

FIG. 6 depicts further example configurations of the gate device 50 and the gate control device 60 according to the present embodiment.

The gate device 50 includes, as functional units, a guidance processing unit 511, an acquisition processing unit 512, and a communication processing unit 513. A part or all of the functional units of the gate device 50 may be software components realized by cooperation of a processor (for example, the CPU 55) of the gate device 50 and a program stored in a memory (for example, the ROM 56 or the storing unit 58) of the gate device 50. A part or all of the functional units of the gate device 50 may be hardware components realized by a dedicated circuit or the like mounted on the gate device 50. A part or all of the functional units of the gate device 50 may be configured by combination of software and hardware.

The guidance processing unit 511 performs processing for informing a customer who uses the store about a store entering and leaving method and the like. For example, the guidance processing unit 511 causes the display unit 54 to display a screen or the like including a message for requesting a customer to place a hand on or touch the reading unit 53. The guidance processing unit 511 causes the display unit 54 to display various screens according to instructions from the gate control device 60.

If the gate device 50 includes other output devices such as the sound output device and the projector device besides the display unit 54, the guidance processing unit 511 may inform a customer of the store entering and leaving method using these output devices.

The acquisition processing unit 512 cooperates with the imaging unit 52 and the reading unit 53 to perform processing for acquiring biometric information from a customer. For example, the acquisition processing unit 512 acquires a face image of a customer via the imaging unit 52. The acquisition processing unit 512 acquires fingerprint information of a customer via the reading unit 53.

The acquisition processing unit 512 may analyze an image captured by the imaging unit 52 to acquire a captured image of the face of the customer as the face image or acquire the image captured by the imaging unit 52 directly as the face image. In the former case, the acquisition processing unit 512 detects face parts such as eyes, a nose, and a mouth from the image captured by the imaging unit 52 to acquire an image including the face parts as the face image. In this case, the acquisition processing unit 512 may use a known technique to extract feature values of the face parts included in the image and acquire the extracted feature values as the face image.

The acquisition processing unit 512 is also capable of controlling timing when the imaging unit 52 and the reading unit 53 operate. For example, the acquisition processing unit 512 starts the imaging by the imaging unit 52 and acquires the face image when the fingerprint information is read by the reading unit 53. By performing such control, the acquisition processing unit 512 can efficiently acquire both the face image and the fingerprint information from the same customer.

The communication processing unit 513 cooperates with the communication unit 59 to perform transmission and reception of various data to and from the external device such as the gate control device 60. For example, the communication processing unit 513 transmits the face image and the fingerprint information acquired by the acquisition processing unit 512 to the gate control device 60 as biometric information of the customer.

For example, in the case where the communication processing unit 513 is included in the first gate device 10, the communication processing unit 513 transmits the acquired face image and fingerprint information to the gate control device 60 as the first biometric information. In the case where the communication processing unit 513 is included in the second gate device 30, the communication processing unit 513 transmits the acquired face image and fingerprint information to the gate control device 60 as the second biometric information. Each of the first biometric information and the second biometric information includes a unique identifier, such as an IP address or a device ID, capable of identifying the first gate device 10 or the second gate device 30 as an information transmission source.

The gate control device 60 includes, as functional units, a communication processing unit 611, a storage control unit 612, a collating unit 613, an opening and closing control unit 614, and a deletion processing unit 615. Apart or all of the functional units of the gate control device 60 may be software components realized by cooperation of a processor (for example, the CPU 61) of the gate control device 60 and a program stored in a memory (for example, the ROM 62 or the storing unit 64) of the gate control device 60. Apart or all of the functional units of the gate control device 60 may be hardware components realized by a dedicated circuit or the like mounted on the gate control device 60. A part or all of the functional units of the gate control device 60 may be configured by combination of software and hardware.

The communication processing unit 611 is an example of a first receiving means or a first receiver and the second receiving means or a second receiver. The communication processing unit 611 cooperates with the communication unit 65 to perform transmission and reception of various data to and from the external devices. For example, the communication processing unit 611 receives the first biometric information and the second biometric information from the first gate device 10 and the second gate device 30, respectively.

The storage control unit 612 is an example of a retaining means or a retaining unit. The storage control unit 612 performs storage and registration of the first biometric information in the store entry management table 641 and management of the store entry management table 641. For example, if the communication processing unit 611 receives the first biometric information including the face image and the fingerprint information, the storage control unit 612 correlates the first biometric information with a reception date and time (for example, a store entry date and time) and registers the first biometric information and the reception date and time in the store entry management table 641 to retain the first biometric information. After registering the first biometric information in the store entry management table 641, the storage control unit 612 notifies completion of the registration to the opening and closing control unit 614.

If the image captured by the imaging unit 52 of the first gate device 10 is directly transmitted as the face image, the storage control unit 612 may extract the image including the face parts from the transmitted image and thereafter register the extracted image in the store entry management table 641 as the face image. The storage control unit 612 may extract the feature values of the face parts included in the image and register the extracted feature values in the store entry management table 641 as the face image.

The storage control unit 612 cooperates with the opening and closing control unit 614, the deletion processing unit 615, and the like to perform processing such as registration and deletion for the store entry management table 641.

If the communication processing unit 611 receives the second biometric information, the collating unit 613 collates the second biometric information with the first biometric information stored in the store entry management table 641. For example, the collating unit 613 retrieves, from the store entry management table 641, the first biometric information matching the second biometric information. The collating unit 613 may retrieve the first biometric information matching both of the face image and the fingerprint information (that is, all of the element information in the present embodiment) included in the second biometric information or may retrieve the first biometric information matching one of the face image and the fingerprint information (that is, a part of the element information in the present embodiment). The collating unit 613 indicates a collation result or a retrieval result to the opening and closing control unit 614.

In the collation process according to the present embodiment, for example, the collating unit 613 searches the first biometric information of which a store or entrance leaving date and time has not yet been registered in the store entry management table 641 among the registered first biometric information.

If the image captured by the imaging unit 52 of the second gate device 30 is directly transmitted as the face image, the collating unit 613 may extract the image including the face parts from the transmitted image and collate, as the face image, the extracted image with the face image of the first biometric information. The collating unit 613 may extract the feature values of the face parts included in the image and collate, as the face image, the extracted feature values with the face image of the first biometric information.

The opening and closing control unit 614 is an example of a first control means or a first controller and a second control means or a second controller. The opening and closing control unit 614 controls opening and closing of the entrance door DIN and the exit door DOUT according to the notifications from the storage control unit 612 and the collating unit 613. For example, upon receipt of the registration completion notification from the storage control unit 612, the opening and closing control unit 614 transmits an opening instruction to the first opening and closing control device 20 to open the entrance door DIN.

Consequently, the customer, whose biometric information has just been collected by the first gate device 10, can enter the store. That is, with the gate control system 1, the customer needs to first provide the first biometric information to be permitted to enter the store. The first opening and closing control device 20 cooperates with the human sensor or the like included in the entrance door DIN to close the entrance door DIN after the customer enters the store.

Once it has been confirmed (based on the processing of the collating unit 613) that first biometric information matching the second biometric information has been previously registered in the store entry management table 641, the opening and closing control unit 614 transmits an opening instruction to the second opening and closing control device 40 to open the exit door DOUT. The opening and closing control unit 614 cooperates with the storage control unit 612 to correlate the present date and time to the first biometric information of the store entry management table 641 matching the second biometric information and stores the present date and time as a store leaving date and time.

Consequently, the customer, whose biometric information has just been collected by the second gate device 30, can exit the store if the second biometric information matches stored first biometric information. That is, with the gate control system 1, only a customer who has already provided first biometric information at entry to the store is subsequently permitted to leave the store. The second opening and closing control device 40 cooperates with the human sensor or the like included in the exit door DOUT to close the exit door DOUT after the customer exits the store.

If first biometric information matching the just acquired second biometric information is absent from the store entry management table 641, it may be presumed that the now-exiting customer entered the store without providing the first biometric information at the entrance door DIN. In this case, in the present embodiment, the opening and closing control unit 614 detains the customer by keeping the exit door DOUT closed while notifying an administrator, a store manager, or the like, to check the customer attempting to exit the store. For example, the opening and closing control unit 614 sends a notification, together with the second biometric information, to a store terminal operated by a store clerk, a terminal device of a management company that manages the store, or the like indicating that a customer, whose first biometric information is apparently unregistered, wishes to leave the store.

Measures to be taken in the case where the first biometric information matching the second biometric information cannot be found in the store entry management table 641 are not limited to the present embodiment. For example, the opening and closing control unit 614 may register the second biometric information in the store entry management table 641 and then transmit the opening instruction to the second opening and closing control device 40 (see Modification 4). In this case, the store can first let the customer leave the store and later notifies an appropriate authority such as a security or a police officer.

The deletion processing unit 615 is an example of a deleting means or a deletion unit. The deletion processing unit 615 cooperates with the storage control unit 612 to delete, at predetermined timing, the first biometric information matching the second biometric information among the first biometric information registered in the store entry management table 641. For example, the deletion processing unit 615 deletes an entry of the first biometric information, which has been registered at least for a predetermined period of time, from the store entry management table 641 based on the date and time information registered in the data item of the store leaving date and time in the store entry management table 641. As the predetermined period of time, any appropriate period such as one day, one week, or one month can be set.

In this way, the deletion processing unit 615 can reduce a burden on the storing unit 64 relating to the retaining and managing the biometric information by periodically deleting first biometric information from the store entry management table 641. The deletion processing unit 615 can also reduce likelihood of a leak (e.g., hacking) of the biometric information by periodically deleting the registered first biometric information.

Figure 7:
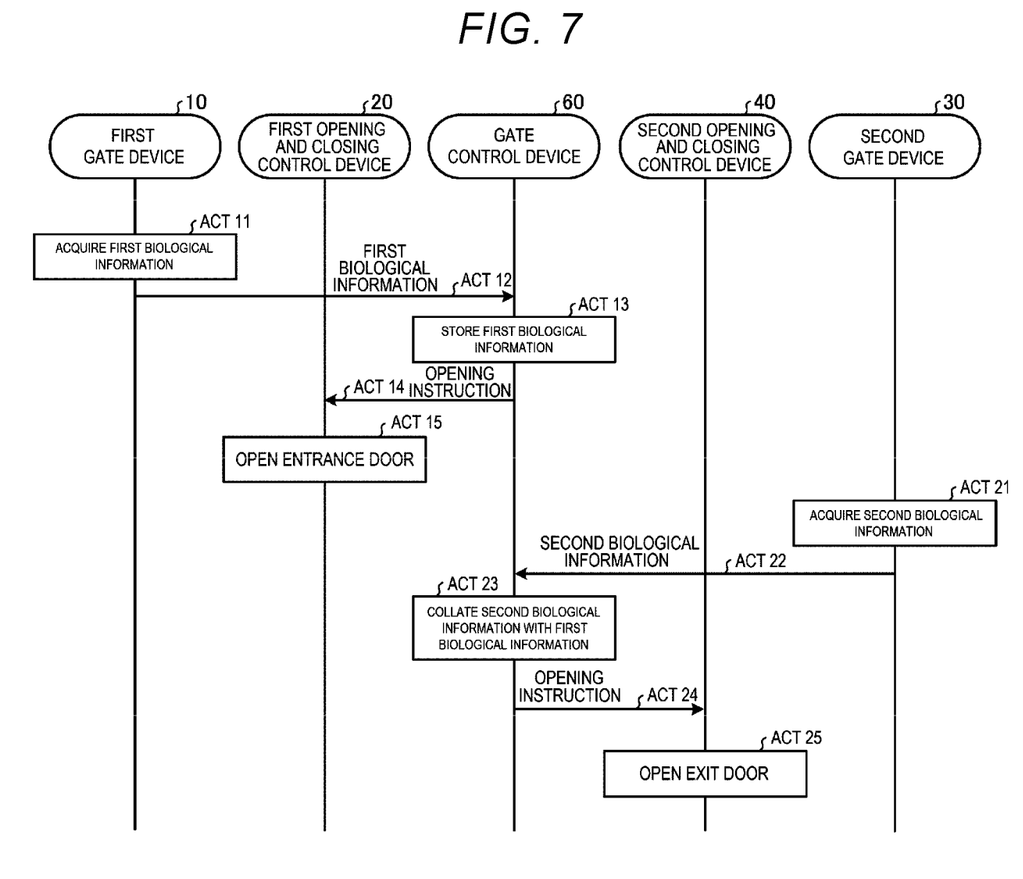
FIG. 7 is a sequence chart of an example operation of a gate control system according to an embodiment.

FIG. 7 is a sequence chart of an example operation of the gate control system 1 according to the present embodiment.

At the first gate device 10, when a customer who wishes to enter a store performs a motion of, for example, touching the reading unit 53 based on an image or the like displayed by the guidance processing unit 511, the acquisition processing unit 512 of the first gate device 10 acquires a face image and fingerprint information as first biometric information from the customer via the imaging unit 52 and the reading unit 53 (ACT 11). Subsequently, the communication processing unit 513 of the first gate device 10 transmits the first biometric information acquired in ACT 11 to the gate control device 60 (ACT 12).

In the gate control device 60, if the first biometric information is received by the communication processing unit 611, the storage control unit 612 correlates the received first biometric information with a reception date and time (for example, a store entry date and time) and stores (registers) the first biometric information in the store entry management table 641 (ACT 13). Once the registration of the first biometric information is complete, the opening and closing control unit 614 transmits an opening instruction to the first opening and closing control device 20 (ACT 14).

Upon receipt of the opening instruction from the gate control device 60, the first opening and closing control device 20 unlocks and opens the entrance door DIN (ACT 15).

According to the processing in ACTS 11 to 15, the gate control system 1 allows the customer who has provided the first biometric information to enter the store. That is, the customer desiring to enter the store can enter the store by providing biometric information via the first gate device 10. The gate control system 1 or the store that utilizes the gate control system 1 can then retain the biometric information as evidence indicating that the particular customer has entered the store. The acquired biometric information can be used to identify the customer and is retain (stored) at least while the customer remains in the store.

If the customer inside the store attempts to leave the store, the gate control system 1 executes the processing in ACTS 21 to 25.

At the second gate device 30, when the customer who wishes to leave the store performs a motion of, for example, touching the reading unit 53 based on a screen or the like displayed by the guidance processing unit 511, the acquisition processing unit 512 of the second gate device 30 acquires a face image and fingerprint information as second biometric information from the customer via the imaging unit 52 and the reading unit 53 (ACT 21). Subsequently, the communication processing unit 513 of the second gate device 30 transmits the second biometric information acquired in ACT 21 to the gate control device 60 (ACT 22).

In the gate control device 60, upon receipt of the second biometric information by the communication processing unit 611, the collating unit 613 collates the second biometric information with the respective first biometric information registered in the store entry management table 641 (ACT 23). If the first biometric information matching one or both of the face image and the fingerprint information included in the second biometric information is present in the store entry management table 641, the opening and closing control unit 614 transmits an opening instruction to the second opening and closing control device 40 (ACT 24).

Upon receipt of the opening instruction from the gate control device 60, the second opening and closing control device 40 unlocks and opens the exit door DOUT (ACT 25).

According to the processing in ACTS 21 to 25, the gate control system 1 allows the customer who has provided the second biometric information that match the retained first biometric information to leave the store. That is, the customer who wishes to leave the store can exit the store only if he or she provides his or her biometric information via the second gate device 30 and such biometric information matches presently retained biometric information acquired upon store entry from the customer. In this way, the store that utilizes the gate control system 1 can detain a customer who somehow manages to enter the store without providing biometric information.

In the present embodiment, the gate control device 60 receives, from the first gate device 10 provided around the entrance of the store, the first biometric information of the customer who is about to enter the store acquired by the first gate device 10 and opens the entrance door DIN on condition that the first biometric information has been retained in the store entry management table 641. The gate control device 60 receives, from the second gate device 30 provided around the exit of the store, the second biometric information of the customer who is about to leave the store acquired by the second gate device 30 and opens the exit door DOUT on condition that the second biometric information matches at least one of the first biometric information retained in the store entry management table 641.

Since the gate control device 60 can cause the customer before entering the store to provide the first biometric information that can uniquely identify the customer, it is possible to eliminate or reduce a possibility of a crime by the customer. Since the gate control device 60 can control store entry and leaving of the customer without causing the customer to, for example, perform member registration or present a membership certificate, it is possible to reduce a burden on the customer and improves customer convenience with respect to collecting customer biometric information upon store entry. Since the gate control device 60 can control store leaving based on a comparison of the biometric information acquired at store entry and exit times, it is possible to reduce a burden in terms of cost relating to retaining and managing personal information including the biometric information and a burden in terms of security such as an information leak compared with a case where user authentication for identifying an individual customer is performed. Therefore, the gate control device 60 can achieve an improved effect of preventing crimes at a store with a simpler configuration.

Modified Embodiments

The present embodiments can be modified by altering a part of the components and functions of the devices as appropriate. Some example modifications are described below as modified embodiments. These modifications may be implemented either individually or in combination as appropriate.

Modification 1

While in the present embodiment, the entrance IN and the exit OUT of the store are severally provided, in one modified embodiment, they may be realized by a common doorway. In the latter case, the same or substantially the same effects as those in the former case can be achieved by providing the first gate device 10 and the second gate device 30 on the outer side and the inner side of the store near the common doorway, respectively. The first opening and closing control device 20 and the second opening and closing control device 40 may be realized as one opening and closing control device for the common doorway.

Modification 2

While in the present embodiment, the first gate device 10 and the second gate device 30 have the same device configuration with each other, in one modified embodiment, they may have different device configurations from each other.

For example, the second gate device 30 may include one of the imaging unit 52 and the reading unit 53. The imaging unit 52 of the first gate device 10 or the first opening and closing control device 20 may be configured by using a monitoring camera provided on the inside or the outside of the store.

Resolutions and sensing accuracy of the imaging unit 52 and the reading unit 53 may be different between the first gate device 10 and the second gate device 30. For example, the resolution and the sensing accuracy of the imaging unit 52 and the reading unit 53 included in the second gate device 30 may be lower than those of the imaging unit 52 and the reading unit 53 included in the first gate device 10.

While in one embodiment, a face (facial) image and/or fingerprint information are acquired as customer's biometric information, in one modified embodiment, other types of biometric information may be acquired from the customer. For example, the reading unit 53 may include a sensor that reads a vein pattern of a palm or an iris pattern of a pupil. The number and types of biometric information to be acquired at each of the first and second gate devices 10 and 30 is not limited.

Modification 3

In the present embodiment, if first biometric information matching second biometric information is absent from the store entry management table 641, a notification indicating the absence of the first biometric information is provided to the store terminal or the like operated by the store clerk and the exit door DOUT is kept closed. However, the measures to be taken when first biometric information matching the second biometric information is absent from the store entry management table 641 are not limited to the present embodiment.

For example, if first biometric information matching the second biometric information is absent from the store entry management table 641, the opening and closing control unit 614 may cooperate with the storage control unit 612 to register the second biometric information in the store entry management table 641 as the first biometric information and thereafter transmit an opening instruction to the second opening and closing control device 40.

This makes it possible to, without preventing the customer from leaving the store, store the exiting customer's biometric information that was not acquired by the first gate device 10. Therefore, further convenience of the customer and efficiency of the store operation can be achieved. If necessary, upon subsequent investigation or the like, the stored biometric information of the exiting customer can be provided for purposes identifying the customer to authorities or the like.

If the second biometric information is registered in the store entry management table 641 as the first biometric information, a store leaving date and time can be registered as well. The same date and time as the store leaving date and time may be registered as a store entry date and time.

Modification 4

In one embodiment, the entrance door DIN is controlled to open on condition that the first biometric information being registered in the store entry management table 641. However, in a modified embodiment, additional conditions may be required to open the entrance door DIN. For example, the entrance door DIN may be opened only if the number of customers present in the store is equal to or less than a threshold. Such additional entrance conditions can be arbitrarily determined and set in advance.

Figure 8:
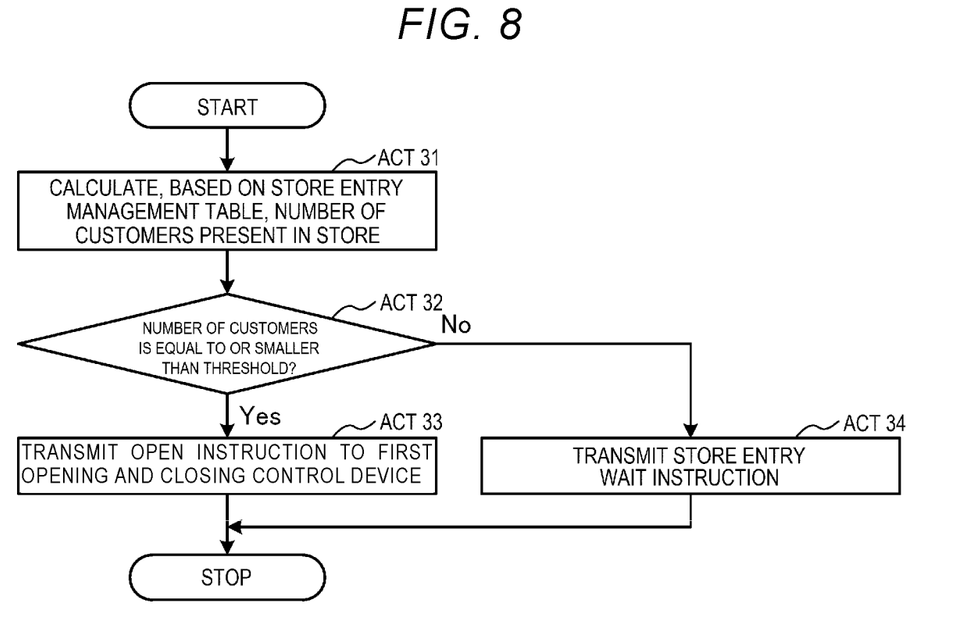
FIG. 8 is a flowchart of example processing by an opening and closing control unit according to a modified embodiment.

FIG. 8 is a flowchart of example processing to be executed by the opening and closing control unit 614 of the gate control device 60 according to this modified embodiment (modification 4). This processing can be executed after ACT 13 in FIG. 7.

First, when first biometric information is registered in the store entry management table 641, the opening and closing control unit 614 also calculates the total number of pieces of first biometric information that presently have no corresponding store leaving date and time registered in the store entry management table 641 (ACT 31). The number of pieces of such first biometric information is equivalent to the number of customers present in the store.

Subsequently, the opening and closing control unit 614 determines whether the calculated number of customers present in the store is equal to or less than a threshold (ACT 32). The threshold can be arbitrarily set. For example, the threshold can be determined based on the size and the like of the store.

If the number of customers present in the store is equal to or less than the threshold (Yes in ACT 32), the opening and closing control unit 614 transmits an opening instruction to the first opening and closing control device 20 (ACT 33) and ends the processing.

If the number of customers present in the store is greater than the threshold (No in ACT 32), the opening and closing control unit 614 transmits, to the first gate device 10, a store entry wait instruction for instructing the customer to wait to enter the store (ACT 34) and ends the processing.

The store entry wait instruction includes, for example, a message indicating that the customer is requested to wait to enter the store and information that compares the number of customers present in the store with the number of customers specified by the threshold. The guidance processing unit 511 of the first gate device 10 causes the display unit 54 to display a screen based on the store entry wait instruction to request the customer to wait until the entry is allowed.

Every time the opening and closing control unit 614 opens the exit door DOUT, the opening and closing control unit 614 correlates a store leaving date and time with corresponding first biometric information and registers the store leaving date and time in the store entry management table 641 and calculates the number of customers present in the store. If the number of customers present in the store decreases to or below the threshold because some customers have left the store, the opening and closing control unit 614 transmits an opening instruction to the first opening and closing control device 20 and notifies the first gate device 10 of the number of people that can be allowed to enter the store, that is the remaining number of people obtained by subtracting the number of customers present in the store from the threshold.

The guidance processing unit 511 of the first gate device 10 then displays, on the display unit 54, the notified number of people that can be allowed to enter the store to instruct the customers who have been waiting at the entrance IN to enter the store until the same number of customers as the notified number enter the store.

The gate control device 60 according to this modified embodiment can achieve the same effects as those by the present embodiment and also can limit the number of customers in the store not to exceed the threshold.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A gate control device, comprising:
a communication interface configured to receive first biometric information acquired by a first gate device from a person at an entrance and second biometric information acquired by a second gate device from a person at an exit;
a storage unit to store the first biometric information received via the communication interface;
a processor configured to:
cause the received first biometric information to be stored in the storage unit,
transmit an opening instruction to the first gate device via the communication interface once the first biometric information has been stored in the storage unit, and
when the second biometric information is received via the communication interface, compare the second biometric information to the first biometric information stored in the storage unit to determine if the received second biometric information matches the stored first biometric information, and
transmit an opening instruction to the second gate device when the received second biometric information matches the stored biometric information, wherein
the processor is further configured to transmit a notification via the communication interface to a manager terminal device when the received second biometric information fails to match the stored biometric information.

2. The gate control device according to claim 1, wherein the first biometric information and the second biometric information include facial recognition data.

3. The gate control device according to claim 1, wherein the processor is further configured to:
delete the first biometric information from the storage unit after the opening instruction is transmitted to the second gate device.

4. The gate control device according to claim 3, wherein the processor deletes the first biometric information within a predetermined time after the opening instruction is transmitted to the second gate device.

5. The gate control device according to claim 1, wherein the processor is further configured to cause the received second biometric information to be stored in the storage unit when the second biometric information fails to match the stored first biometric information.

6. A gate control system, comprising:
a gate control device including:
a communication interface,
a storage unit, and
a processor;
a first gate device at an entrance and configured to acquire first biometric information from a person at the entrance and transmit the first biometric information to the gate control device; and
a second gate device at an exit and configured to acquire second biometric information from a person at the exit and transmit the second biometric information to the gate control device, wherein
the processor is configured to:
cause the first biometric information received via the communication interface to be stored in the storage unit,
transmit an opening instruction to the first gate device via the communication interface once the first biometric information has been stored in the storage unit, and
when the second biometric information is received via the communication interface, compare the second biometric information to the first biometric information stored in the storage unit to determine if the received second biometric information matches the stored first biometric information,
transmit an opening instruction to the second gate device when the received second biometric information matches the stored biometric information, and
transmit a notification via the communication interface to a manager terminal device when the received second biometric information fails to match the stored biometric information.

7. The gate control system according to claim 6, wherein the first biometric information and the second biometric information include facial recognition data.

8. The gate control system according to claim 6, wherein the processor is further configured to:
delete the first biometric information from the storage unit after the opening instruction is transmitted to the second gate device.

9. The gate control system according to claim 8, wherein the processor deletes the first biometric information within a predetermined time after the opening instruction is transmitted to the second gate device.

10. The gate control system according to claim 6, wherein the processor is further configured to cause the received second biometric information to be stored in the storage unit when the second biometric information fails to match the stored first biometric information.

11. A gate control method to be executed by a gate control device, the gate control method comprising:
receiving first biometric information acquired by a first gate device at an entrance;
retaining the received first biometric information;
opening the entrance on the condition that the first biometric information has been retained;
receiving second biometric information acquired by a second gate device at an exit;
opening the exit if the received second biometric information matches the retained first biometric information; and
sending a notification to a manager terminal when the received second biometric information fails to match the retained first biometric information.

12. The gate control method according to claim 11, wherein
the first biometric information and the second biometric information include at least one of facial recognition data and fingerprint data.

13. The gate control method according to claim 11, further comprising:
deleting the first biometric information after second biometric information matching the first biometric information is received.

14. The gate control method according to claim 13, wherein the first biometric information is deleted after a predetermined length of time.

15. The gate control method according to claim 11, further comprising:
retaining the received second biometric information if the received second biometric information does not match the first biometric information.

16. The gate control method according to claim 11, further comprising:
retaining entrance entry date and time in addition to the first biometric information.

* * * * *